United States Patent
Lim et al.

(10) Patent No.: US 10,723,852 B2
(45) Date of Patent: *Jul. 28, 2020

(54) HEAT SHRINKABLE FILM COMPOSITION COMPRISING POLYETHYLENETEREPHTALATE RESIN AND POLYESTER BASED COPOLYMER, AND HEAT SHRINKABLE FILM

(71) Applicant: SK CHEMICALS CO., LTD., Gyeonggi-do (KR)

(72) Inventors: Seol-Hee Lim, Seoul (KR); Sung-Gi Kim, Gyeonggi-do (KR)

(73) Assignee: SK Chemicals Co., Ltd., Seongnam (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/919,676

(22) Filed: Mar. 13, 2018

(65) Prior Publication Data

US 2018/0223060 A1    Aug. 9, 2018

Related U.S. Application Data

(62) Division of application No. 14/898,689, filed as application No. PCT/KR2014/005264 on Jun. 16, 2014, now abandoned.

(30) Foreign Application Priority Data

Jun. 17, 2013    (KR) .................. 10-2013-0069128

(51) Int. Cl.
| | | |
|---|---|---|
| *C08J 5/18* | (2006.01) | |
| *B29C 48/00* | (2019.01) | |
| *C08G 63/199* | (2006.01) | |
| *C08G 63/672* | (2006.01) | |
| *C08L 67/02* | (2006.01) | |
| *B29C 45/00* | (2006.01) | |
| *B29C 55/00* | (2006.01) | |

(Continued)

(52) U.S. Cl.
CPC ............. *C08J 5/18* (2013.01); *B29C 45/0001* (2013.01); *B29C 48/022* (2019.02); *B29C 55/005* (2013.01); *C08G 63/199* (2013.01); *C08G 63/672* (2013.01); *C08L 67/02* (2013.01); *B29K 2067/003* (2013.01); *B29L 2007/008* (2013.01); *C08J 2367/02* (2013.01); *C08J 2467/02* (2013.01); *C08L 2201/10* (2013.01); *C08L 2203/16* (2013.01); *C08L 2205/025* (2013.01)

(58) Field of Classification Search
CPC .. C08L 67/02; C08L 2201/10; C08L 2203/16; C08L 2205/025; B29C 45/0001; B29C 48/022; B29C 55/005; B29K 2067/003; B29L 2007/008; C08G 63/199; C08G 63/672; C08J 2367/02; C08J 2467/02; C08J 5/18

See application file for complete search history.

(56) References Cited

U.S. PATENT DOCUMENTS

| 5,859,116 A | 1/1999 | Shih et al. |
| 2004/0220300 A1 | 11/2004 | Valentine et al. |

(Continued)

FOREIGN PATENT DOCUMENTS

| JP | H03-142224 | 6/1991 |
| JP | H10-139988 | 5/1998 |

(Continued)

OTHER PUBLICATIONS

Eastman™ CHDM-D90 1,4-C clohexanedinnethanol—Sales Specification (Year: 2010).*
Molding Machine Control Set-up—Setting Barrel Temperatures, Sep. 2013 (Year: 2013).*
Dow—Technical Information—VERSIFY Blown Film Processing Guide, Apr. 2009 (Year: 2009).*

(Continued)

Primary Examiner — Ling Siu Choi
Assistant Examiner — Gennadiy Mesh
(74) *Attorney, Agent, or Firm* — Sheridan Ross P.C.

(57) ABSTRACT

There is provided a composition for forming a heat shrinkable film capable of providing a heat shrinkable film capable of having an excellent shrinkage rate and being heat-shrunk at a low temperature. The composition for forming a heat shrinkable film includes a polyethylene terephthalate (PET) resin having an inherent viscosity of 0.50 to 1.2 dl/g, and a polyester based copolymer including a dicarboxylic acid-derived residue including a residue derived from an aromatic dicarboxylic acid and a diol-derived residue including a residue derived from 4-(hydroxymethyl)cyclohexylmethyl 4'-(hydroxymethyl)cyclohexane carboxylate represented by the following Chemical Formula 1 and a residue derived from 4,4-(oxybis(methylene)bis) cyclohexane methanol represented by the following Chemical Formula 2.

[Chemical Formula 1]

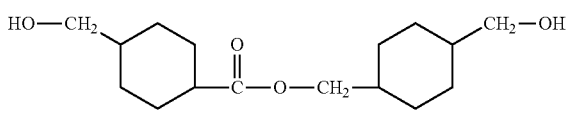

[Chemical Formula 2]

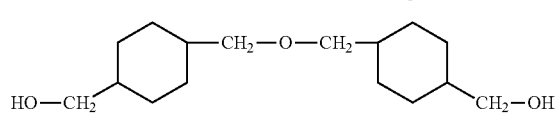

1 Claim, No Drawings

(51) Int. Cl.
*B29K 67/00* (2006.01)
*B29L 7/00* (2006.01)

(56) References Cited

U.S. PATENT DOCUMENTS

| | | | |
|---|---|---|---|
| 2005/0010018 A1* | 1/2005 | Kim | C08G 63/199 528/307 |
| 2009/0227735 A1 | 9/2009 | Shih et al. | |
| 2012/0226014 A1 | 9/2012 | Lee et al. | |
| 2012/0329980 A1 | 12/2012 | George et al. | |
| 2016/0122485 A1 | 5/2016 | Lim et al. | |

FOREIGN PATENT DOCUMENTS

| | | |
|---|---|---|
| JP | 2000-504761 | 4/2000 |
| JP | 3642544 | 4/2005 |
| KR | 10-2008-0043587 | 5/2008 |
| KR | 10-2008-0056470 | 6/2008 |
| KR | 20080056470 * | 6/2008 |
| KR | 10-2008-0109264 | 12/2008 |
| KR | 10-2014-0130937 | 11/2014 |

OTHER PUBLICATIONS

"Eastman CHDM-D90 (1,4-Cyclohexanedimethanol) Data Sheet," Eastman Sales Specification, Oct. 18, 2010, 1 page.
International Search Report for International Patent Application No. PCT/KR2014/005264, dated Sep. 30, 2014, 2 pages.
Extended Search Report for European Patent Application No. 14814451.2, dated Nov. 29, 2016, 5 pages.
Official Action for U.S. Appl. No. 14/898,689, dated Dec. 6, 2016 9 pages.
Official Action for U.S. Appl. No. 14/898,689, dated Feb. 23, 2017 11 pages.
Official Action for U.S. Appl. No. 14/898,689, dated Oct. 13, 2017 13 pages.

* cited by examiner

HEAT SHRINKABLE FILM COMPOSITION COMPRISING POLYETHYLENETEREPHTALATE RESIN AND POLYESTER BASED COPOLYMER, AND HEAT SHRINKABLE FILM

CROSS REFERENCE TO RELATED APPLICATIONS

This application is a divisional application of pending U.S. patent application Ser. No. 14/898,689 filed Dec. 15, 2015, which is a national stage application under 35 U.S.C. § 371 and claims the benefit of PCT Application No. PCT/KR2014/005624 having an international filing date of Jun. 16, 2014, which designated the United States, which PCT application claimed the benefit of Korean Patent Application No. 10-2013-0069128 filed Jun. 17, 2013, the disclosures of each of which are incorporated herein by reference.

TECHNICAL FIELD

The present invention relates to a composition for forming a heat shrinkable film including a polyethylene terephthalate resin and a polyester based copolymer, and more particularly, to a composition for forming a heat shrinkable film capable of providing a heat shrinkable film capable of having an excellent shrinkage rate and being heat-shrunk at a low temperature.

BACKGROUND

A heat shrinkable plastic product uses a property of being shrunk by heating and is widely used as a film for a shrinkage package, a shrinkage label, or the like. Among them, polyvinyl chloride (PVC), polystyrene, and polyester based plastic films, and the like, have been used as a label or cap seal of various containers, or the like, or used as a direct package material, or the like.

However, a film made of polyvinyl chloride is a regulation object since at the time of burning up the film, materials generating hydrogen chloride gas and dioxin may be generated. In addition, when this product is used as a shrinkage label of a polyethylene terephthalate (PET) container, or the like, at the reusing the container, a troublesome process of separating the label and the container should be performed.

Further, in the polystyrene based film, stability in work depending on a shrinkage process may be excellent and an appearance of the product may be good, but chemical resistance may not be excellent, such that there is a problem in that at the time of printing, an ink having a specific composition should be used. Further, the polystyrene based film has a disadvantage in that since storage stability at room temperature is insufficient, the film may be spontaneously shrunk, such that a dimension thereof may be changed.

In order to solve the above-mentioned problems, a film made of a polyester resin has been studied and developed as a film capable of replacing the films made of the above-mentioned two raw materials. Meanwhile, as a use amount of the PET container is increased, a use amount of a polyester film capable of being easily reused without separately separating a label at the time of reuse has been gradually increased, but a heat shrinkable polyester film according to the related art had a problem in view of shrinkage characteristics. That is, there was a problem in that wrinkles at the time of shrinkage or non-uniform shrinkage during molding was frequently generated due to a rapid change in shrinkage behavior. In addition, since a shrinkage property of the polyester film at a low temperature was decreased as compared to the polyvinyl chloride based film or the polystyrene based film, in order to complement this disadvantage, the polyester film should be shrunk at a high temperature. In this case, there was a problem in that PET container may be deformed, or a white-turbidity phenomenon may be generated.

Therefore, research into a technology of preparing a polyester heat shrinkable film capable of solving the above-mentioned problems and having excellent properties as compared to the existing polyester resin has been required.

DISCLOSURE

Technical Problem

The present invention has been made in an effort to provide a composition for forming a heat shrinkable film capable of providing a heat shrinkable film capable of having an excellent shrinkage rate and being heat-shrunk at a low temperature.

Technical Solution

An exemplary embodiment of the present invention provides a composition for forming a heat shrinkable film including a polyethylene terephthalate (PET) resin having an inherent viscosity of about 0.50 to 1.2 dl/g; and a polyester based copolymer including a dicarboxylic acid-derived residue including a residue derived from an aromatic dicarboxylic acid, and a diol-derived residue including a residue derived from 4-(hydroxymethyl)cyclohexylmethyl 4'-(hydroxymethyl)cyclohexane carboxylate represented by the following Chemical Formula 1 and a residue derived from 4,4-(oxybis(methylene)bis) cyclohexane methanol represented by the following Chemical Formula 2.

[Chemical Formula 1]
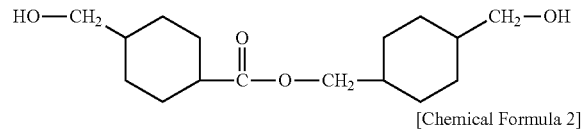

[Chemical Formula 2]
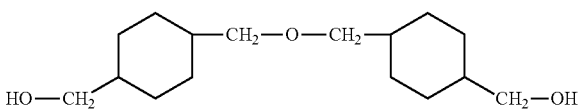

The polyester based copolymer may have an inherent viscosity of about 0.60 to 0.90 dl/g or about 0.70 to 0.87 dl/g.

The polyethylene terephthalate (PET) resin may be included at a content of about 1 to 99 mol %, and the polyester based copolymer may be included at a content of about 1 to 99 mol %.

The diol-derived residue may further include a residue derived from one or more other diols selected from a group consisting of 1,4-cyclohexane dimethanol, 1,2-propanediol, 1,3-propanediol, 1,4-butanediol, 2,2-dimethyl-1,3-propanediol, 1,6-hexanediol, 1,2-cyclohexanediol, 1,4-cyclohexanediol, 1,2-cyclohexane dimethanol, 1,3-cyclohexane dimethanol, 2,2-dimethylpropane-1,3-diol (neopentyl glycol), ethylene glycol, and diethylene glycol. A content of the diol-derived residues of the residue derived from 4-(hydroxymethyl)cyclohexylmethyl 4'-(hydroxymethyl)cyclohexane carboxylate, the residue derived from 4,4-(oxybis (methylene)bis) cyclohexane methanol, and other diol-derived residues may be about 10 to 80 mol % based on 100 mol % of the dicarboxylic acid.

The aromatic dicarboxylic acid may be one or more selected from a group consisting of terephthalic acid, dimethyl terephthalate, cyclic dicarboxylic acid, isophthalic acid, adipic acid, azelaic acid, naphthalenedicarboxylic acid, and succinic acid.

The polyester based copolymer may be prepared by reacting the dicarboxylic acid including the aromatic dicarboxylic acid with the diol including 4-(hydroxymethyl)cyclohexylmethyl 4'-(hydroxymethyl)cyclohexane carboxylate represented by Chemical Formula 1 and 4,4-(oxybis(methylene)bis) cyclohexane methanol represented by Chemical Formula 2 to perform an esterification reaction and an polycondensation reaction. In this case, other diols such as 1,4-cyclohexane dimethanol, ethylene glycol, diethylene glycol, or the like, as described above may be further reacted, such that a polyester based copolymer further including other diol-derived residues may be prepared.

The esterification reaction is performed at a reaction temperature of 230 to about 265° C. and a pressure of about 1.0 to 3.0 kg/cm² for about 100 to 300 minutes after injecting the diol at a molar ratio of about 1.2 to 3.0 with respect to the dicarboxylic acid.

In the polycondensation reaction, additives including a catalyst, a stabilizer, and a coloring agent may be used.

The polycondensation reaction may be performed at a reaction temperature of about 260 to 290° C. and a reduced pressure of about 400 to 0.1 mmHg.

Another exemplary embodiment of the present invention provides a method for preparing a heat shrinkable film including: injecting and extruding the composition as described above to draw the extruded product.

Another exemplary embodiment of the present invention provides a heat shrinkable film including: a polyethylene terephthalate (PET) resin having an inherent viscosity of about 0.50 to 1.2 dl/g; and a polyester based copolymer including a dicarboxylic acid-derived residue including a residue derived from an aromatic dicarboxylic acid, and a diol-derived residue including a residue derived from 4-(hydroxymethyl)cyclohexylmethyl 4'-(hydroxymethyl)cyclohexane carboxylate represented by the above Chemical Formula 1 and a residue derived from 4,4-(oxybis(methylene)bis) cyclohexane methanol represented by the above Chemical Formula 2.

Advantageous Effects

The composition for forming a heat shrinkable film according to the present invention includes the polyester based copolymer capable of having an excellent shrinkage rate as compared to the polyester based copolymer according to the related art, and being heat-shrunk at a low temperature, similarly to the PVC, thereby making it possible to prevent deformation of the PET container or the white-turbidity phenomenon that was caused in the heat shrinkage process of the film. In addition, the heat shrinkable film capable of having an excellent shrinkage rate and being heat shrunk at a low temperature may be prepared by blending the polyester based copolymer with PET. Further, in the method for preparing a heat shrinkable film according to the present invention, the shrinkage rate and the shrinkage initiation temperature may be adjusted by adjusting the content of the polyester resin at a desired level.

BEST MODE

The present invention may be variously modified and have various exemplary embodiments, and specific embodiments of the present invention will be descried in detail. However, the present invention is not limited to specific exemplary embodiments described herein, but all of the modifications, equivalents, and substitutions within the spirit and scope of the present invention are also included in the present invention. Further, when it is determined that the detailed description of the known art related to the present invention may obscure the gist of the present invention, the detailed description thereof will be omitted.

According to an aspect of the present invention, there is provided a composition for forming a heat shrinkable film including a polyethylene terephthalate (PET) resin having an inherent viscosity of about 0.50 to 1.2 dl/g; and a polyester based copolymer including a dicarboxylic acid-derived residue including a residue derived from an aromatic dicarboxylic acid and a diol-derived residue including a residue derived from 4-(hydroxymethyl)cyclohexylmethyl 4'-(hydroxymethyl)cyclohexane carboxylate represented by the following Chemical Formula 1 and a residue derived from 4,4-(oxybis(methylene)bis) cyclohexane methanol represented by the following Chemical Formula 2.

[Chemical Formula 1]

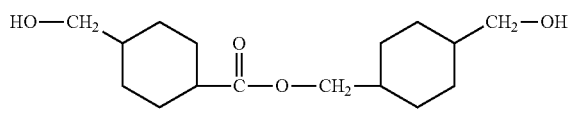

[Chemical Formula 2]

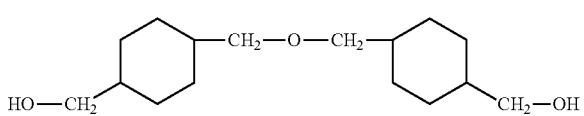

In addition, according to another aspect of the present invention, there is provided a method for preparing a heat shrinkable film including: injecting and extruding the composition for forming a heat shrinkable film to draw the extruded product.

Hereinafter, the composition for forming a heat shrinkable film according to an exemplary embodiment of the present invention will be described in more detail.

As used herein, the term 'residue' means a predetermined moiety or unit included in a resultant of a chemical reaction when a specific compound participates in the chemical reaction, and derived from the specific compound. For example, the 'dicarboxylic acid-derived residue' and the 'diol-derived residue' mean moieties derived from a dicarboxylic acid component and a diol component in polyester formed by an esterification reaction or a polycondensation reaction, respectively.

The composition for forming a heat shrinkable film according to an exemplary embodiment of the present invention includes the polyethylene terephthalate (PET) resin having an inherent viscosity of about 0.50 to 1.2 dl/g; and the polyester based copolymer including the dicarboxylic acid-derived residue including the residue derived from an aromatic dicarboxylic acid and the diol-derived residue including the residue derived from 4-(hydroxymethyl)cyclohexylmethyl 4'-(hydroxymethyl)cyclohexane carboxylate represented by Chemical Formula 1 and the residue derived from 4,4-(oxybis(methylene)bis) cyclohexane methanol represented by Chemical Formula 2.

In a polyester film according to the related art, there was a problem in that wrinkles at the time of shrinkage or non-uniform shrinkage during molding was frequently generated due to a rapid change in shrinkage behavior. In addition, since a shrinkage property of the polyester film at a low temperature was decreased as compared to the polyvinyl chloride based film or the polystyrene based film, in order to complement this disadvantage, the polyester film should be shrunk at a high temperature. In this case, there was a problem in that PET container may be deformed, or a white-turbidity phenomenon may be generated.

Therefore, the present inventors confirmed through experiments that at the time of preparing a polyester based copolymer, in the case of using a diol including 4-(hydroxymethyl)cyclohexylmethyl 4'-(hydroxymethyl)cyclohexane carboxylate and 4,4-(oxybis(methylene)bis) cyclohexane methanol, since a shrinkage rate was excellent and the polyester based copolymer may be heat-shrunk at a low temperature, similarly to a PVC, deformation of a PET container or a white-turbidity phenomenon that was caused in a heat shrinkage process of the film may be prevented, a molding defect may be decreased due to easiness to adjust a shrinkage rate, and in the case of blending the polyester based copolymer and the PET at a specific composition ratio, a heat shrinkable film capable of having an excellent shrinkage rate and being heat shrunk at a low temperature may be prepared, thereby completing the present invention.

As a diol compound used in order to improve moldability or other physical properties of the polyester based copolymer, there are 4-(hydroxymethyl)cyclohexylmethyl 4'-(hydroxymethyl)cyclohexane carboxylate, 4,4-(oxybis(methylene)bis) cyclohexane methanol, 1,4-cyclohexane dimethanol, 1,2-propanediol, 1,3-propanediol, 1,4-butanediol, 2,2-dimethyl-1,3-propanediol, 1,6-hexanediol, 1,2-cyclohexanediol, 1,4-cyclohexanediol, 1,2-cyclohexane dimethanol, 1,3-cyclohexane dimethanol, and the like. Particularly, as the diol compound used in order to improve physical properties of a polymer, 4-(hydroxymethyl)cyclohexylmethyl 4'-(hydroxymethyl)cyclohexane carboxylate and 4,4-(oxybis(methylene)bis) cyclohexane methanol are preferable. The reason is that in the case of using 4-(hydroxymethyl)cyclohexylmethyl 4'-(hydroxymethyl)cyclohexane carboxylate and 4,4-(oxybis(methylene)bis) cyclohexane methanol, since a molecular chain length at a predetermined level or more associated with residual stress is increased as compared to the case of using the above-mentioned compounds, residual stress depending on the drawing may be increased, such that at the time heat supply, shrinkage force may be increased in accordance with residual stress relaxation.

4-(hydroxymethyl)cyclohexylmethyl 4'-(hydroxymethyl)cyclohexane carboxylate is represented by the following Chemical Formula 1, and 4,4-(oxybis(methylene)bis) cyclohexane methanol is represented by the following Chemical Formula 2.

[Chemical Formula 1]

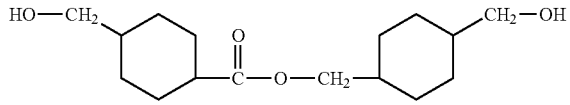

[Chemical Formula 2]

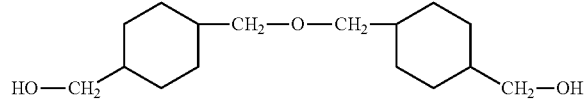

A use amount of 4-(hydroxymethyl)cyclohexylmethyl 4'-(hydroxymethyl)cyclohexane carboxylate and 4,4-(oxybis(methylene)bis) cyclohexane methanol used in the present invention is close to desired mol % in a final polymer. In order to prevent a moldability defect depending on crystallization, it is preferable that the use amount is about 2 to 17 mol % of the entire diol component. The reason is that in the case in which the use amount is less than about 2 mol %, it is difficult to confirm an effect of improving the shrinkage rate, and in the case in which the use amount is more than about 17 mol %, the white turbidity-phenomenon may be generated due to over-drawing, such that utility of the polyester based copolymer as a raw material for the heat shrinkable film is deteriorated.

In addition, the polyester based copolymer may have an inherent viscosity of about 0.60 to 0.90 dl/g or about 0.7 to 0.87 dl/g. Here, in the case in which the inherent viscosity of the polyester based copolymer is less than about 0.60 dl/g, mechanical properties may be deteriorated due to a low molecular weight, and in the case in which the inherent viscosity is more than about 0.9 dl/g, a high pressure and a high temperature are required at the time of blending and molding, such that efficiency may be deteriorated.

Meanwhile, in the composition for forming a heat shrinkable film according to the present invention, the polyethylene terephthalate (PET) resin having an inherent viscosity of about 0.50 to 1.2 dl/g is used.

The PET resin is polymerized generally from a dicarboxylic acid and a diol as known in the art. As the dicarboxylic acid and a derivative thereof used in polymerizing the PET resin, there are terephthalic acid (TPA), isophthalic acid (IPA), 2,6-naphthalenedicarboxylic acid (2,6-NDA), dimethyl terephthalic acid (DMT), dimethylisophthalate (DMI), dimethyl 2,6-naphthalenedicarboxylate (2,6-NDC), 1,4-Dimethyl cyclohexane dicarboxylate (DMCD), and the like, but the present invention is not limited thereto.

In addition, as the diol used in polymerizing the PET resin, there are ethylene glycol (EG), diethylene glycol (DEG), propylene glycol (PG), neopentyl glycol (NPG), cyclohexane dimethanol (CHDM), and the like, but the present invention is not limited thereto. All of diols known in the art may be used in preparing the PET resin, but EG may be preferable.

The PET resin is polymerized by injecting the dicarboxylic acid and the diol, which are raw materials, in a reactor at a high temperature and a high pressure to prepare an oligomer and adding a reaction catalyst, a stabilizer, and a coloring agent to the prepared oligomer as needed to perform a reaction at a high temperature under vacuum, but is not particularly limited. The PET resin may be polymerized by the method known in the art.

Meanwhile, a mixing ratio of each of the PET resin prepared as described above and a transparent polyester based copolymer may be variously adjusted so that contents of cyclohexane dimethanol compounds in the polymer after the entire blending may be adjusted to have desired contents. The polyethylene terephthalate (PET) resin may be included at a content of about 1 to 99 mol %, and the polyester based copolymer may be included at a content of about 1 to 99 mol %.

Further, in the polyester based copolymer, the diol-derived residue may further include a residue derived from one or more other diols selected from a group consisting of 1,4-cyclohexane dimethanol, 1,2-propanediol, 1,3-propanediol, 1,4-butanediol, 2,2-dimethyl-1,3-propanediol, 1,6-hexanediol, 1,2-cyclohexanediol, 1,4-cyclohexanediol, 1,2-cyclohexane dimethanol, 1,3-cyclohexane dimethanol, 2,2- dimethylpropane-1,3-diol (neopentyl glycol), ethylene glycol, and diethylene glycol.

In addition, a content the diol-derived residues such as the residue derived from of 4-(hydroxymethyl)cyclohexylmethyl 4'-(hydroxymethyl)cyclohexane carboxylate, the residue derived from 4,4-(oxybis(methylene)bis) cyclohexane methanol, and other diol-derived residues of the above-mentioned 1,4-cyclohexane dimethanol, ethylene glycol, or diethylene glycol, or the like, may be about 10 to 80 mol % based on 100 mol % of the dicarboxylic acid.

The reason is that in the case in which the content of the diol-derived residue is less than 10 mol %, since a crystal shape is not formed, a shrinkage rate is significantly low, and an initiation temperature is high, there is a limitation in a utilization range, and in the case in which the content is more than 80 mol %, since pyrolysis is generated due to an increase in a processing temperature, there are problems in that a transparency of a product may be deteriorated, and a color unexpectedly becomes yellow.

More specifically, based on 100 mol % of the dicarboxylic acid-derived residue, the polyester based copolymer may include about 0.1 to 10 mol % of the residue derived from 4-(hydroxymethyl)cyclohexylmethyl 4'-(hydroxymethyl) cyclohexane carboxylate, about 0.1 to 12 mol % of the residue derived from 4,4-(oxybis(methylene)bis) cyclohexane methanol, and the residual content of other diol-derived residues in a total content of the above-mentioned diol-derived residue (for example, about 80 mol % or less, based on 100 mol % of the dicarboxylic acid-derived residue).

In addition, the aromatic dicarboxylic acid may be one or more selected from a group consisting of terephthalic acid, dimethyl terephthalate, cyclic dicarboxylic acid, isophthalic acid, adipic acid, azelaic acid, naphthalenedicarboxylic acid, and succinic acid.

Meanwhile, the polyester based copolymer may be prepared by reacting the dicarboxylic acid including the aromatic dicarboxylic acid with the diol including 4-(hydroxymethyl)cyclohexylmethyl 4'-(hydroxymethyl) cyclohexane carboxylate represented by Chemical Formula 1 and 4,4-(oxybis(methylene)bis) cyclohexane methanol represented by Chemical Formula 2 to perform the esterification reaction and the polycondensation reaction. In this case, other diols such as 1,4-cyclohexane dimethanol, ethylene glycol, diethylene glycol, or the like, as described above may be further reacted, such that a polyester based copolymer further including other diol-derived residues may be prepared.

The polyester based copolymer is prepared through the esterification reaction and the polycondensation reaction. The esterification reaction corresponding to a first step may be carried out batchwise or continuously, and each raw material may be separately injected, but preferably, the dicarboxylic acid may be injected into the diol in a slurry form.

In addition, the esterification reaction is performed at a reaction temperature of about 230 to 265° C., more preferably, about 245 to 255° C., and a pressure of about 1.0 to 3.0 kg/cm$^2$ after injecting the diol at a molar ratio of about 1.2 to 3.0 with respect to the dicarboxylic acid. Further, a reaction time of the esterification reaction may be generally about 100 to 300 minutes, but since the reaction time may be suitably changed according to the reaction temperature, the pressure, and the molar ratio of the glycol to the used dicarboxylic acid, the reaction time is not limited thereto.

Meanwhile, the esterification reaction does not require a catalyst, but in order to decrease the reaction time, a catalyst may be selectively injected.

After the above-mentioned esterification reaction is completed, the polycondensation reaction is carried out, and a catalyst, a stabilizer, a coloring agent, and the like, may be selectively used as components generally used at the time of polycondensation reaction of a polyester resin.

As a polycondensation catalyst usable in the present invention, there are titanium, germanium, and antimony compounds, and the like, but the present invention is not particularly limited thereto.

The titanium based catalyst, which is a catalyst used as a polycondensation catalyst of a polyester resin in which cyclohexane dimethanol based derivative is copolymerized at a ratio of about 15% or more based on a weight of terephthalic acid, has advantages in that even in the case of using a small amount of the titanium based catalyst as compared to the antimony based catalyst, the polycondensation reaction may be carried out, and the titanium based catalyst is cheaper than the germanium based catalyst.

More specifically, as a usable titanium based catalyst, there are tetraethyl titanate, acetyltripropyl titanate, tetrapropyl titanate, tetrabutyl titanate, polybutyl titanate, 2-ethylhexyl titanate, octylene glycol titanate, latate titanate, triethanolamine titanate, acetylacetonate titanate, ethylacetoacetic ester titanate, isostearyl titanate, titanium dioxide, coprecipitates of titanium dioxide and silicon dioxide, coprecipitates of titanium dioxide and zirconium dioxide, and the like.

In this case, since a use amount of the polycondensation catalyst affects a color of the final polymer, the use amount may be changed according to the desired color, the used stabilizer, and the used coloring agent, but the use amount may be preferably about 1 to 100 ppm, more preferably, about 1 to 50 ppm, based on a content of a titanium element with respect to a weight of the final polymer, and may be preferably about 10 ppm or less based on a content of a silicon element. The reason is that in the case in which the content of the titanium element is less than about 1 ppm, it is impossible to reach a desired degree of polymerization, and in the case in which the content is more than about 100 ppm, the final polymer becomes yellow, such that it is impossible to obtain a desired color.

Further, as other additives, the stabilizer, the coloring agent, and the like, may be used. As the stabilizer usable in the present invention, there are phosphoric acid, trimethyl phosphate, triethyl phosphate, triethylphosphonoacetate, and the like, and an addition amount thereof may be preferably about 10 to 100 ppm based on a content of a phosphorus element with respect to the weight of the final polymer. The reason is that in the case in which the addition amount of the stabilizer is less than about 10 ppm, it is difficult to obtain the desired bright color, and in the case in which the addition amount is more than about 100 ppm, it is impossible to reach a desired high degree of polymerization.

Further, as the coloring agent usable in the present invention in order to improve the color, there are cobalt acetate, cobalt propionate, and the like, and an addition amount thereof may be preferably about 100 ppm or less based on the weight of the final polymer. Furthermore, in addition to the coloring agent, an existing organic compound known in the art may be used as the coloring agent.

Meanwhile, the polycondensation reaction performed after adding these components may be preferably performed at about 260 to 290° C. and a reduced pressure of about 400 to 0.1 mmHg, but is not limited thereto.

The polycondensation step is performed until viscosity of the reactant reaches a desired inherent viscosity. In this case, a reaction temperature may be generally about 260 to 290° C., preferably about 260 to 280° C., and more preferably about 265 to 275° C.

According to another aspect of the present invention, there is provided a method for preparing a heat shrinkable film including: injecting and extruding the composition for forming a heat shrinkable film to draw the extruded product.

More specifically, a polyethylene terephthalate (PET) resin chip having an inherent viscosity of about 0.50 to 1.2 dl/g, prepared as described above, and a polyester based copolymer chip were prepared, dried, and mixed with each other in a stirrer. Then, a film was subjected to an injecting and extruding process, and closely adhered to a roll to thereby obtain an undrawn film. Thereafter, the undrawn film may be drawn, thereby preparing a heat shrinkable film.

Here, a drying process of the PET may be performed at about 120 to 160° C., and a drying process of the polyester based copolymer may be performed at about 55 to 75° C. However, the conditions for the drying process may be changed suitably considering the desired shrinkage rate and a shrinkage initiation temperature. At the time of molding, in order to remove a fusion factor of a transparent polymerized polyester resin at the time of molding in blending with the transparent polyester based copolymer, it is preferable that a temperature of a feeding zone of an injection machine needs to be lowered, and a temperature of a rear zone thereof is set to be relatively high. The composition including a PET resin and a polyester based copolymer according to the present invention, prepared as described above may be molded by a general molding process known in the art, such that a molding product having a suitable shape may be prepared as needed.

Hereinafter, preferable Examples of the present invention will be described in detail. However, this example is only to illustrate the present invention and is not to be construed as limiting a scope of the present invention.

Example 1

A PET resin chip having an inherent viscosity of 0.80 dl/g and a polyester based copolymer chip of which an inherent viscosity was 0.75 dl/g and in which a content of cyclohexane dimethanol based compounds (4-(hydroxymethyl)cyclohexylmethyl 4'-(hydroxymethyl)cyclohexane carboxylate, 4,4-(oxybis(methylene)bis) cyclohexane methanol, and 1,4-cyclohexane dimethanol) in a polymer was 30 mol % based on a content of terephthalic acid were used as raw materials. After the resin chips were dried, the PET resin and the polyester based copolymer were mixed at a ratio of 1:9 in a rotary stirrer and put into a hopper of an injection machine. Then, a film was extruded using an extruder and closely adhered to a roll to obtain an undrawn film. Thereafter, the undrawn film was drawn, thereby preparing a heat shrinkable film.

Example 2

A heat shrinkable film was prepared by the same method in Example 1 except that the PET resin chip and the polyester based copolymer chip were blended at a ratio of 7:3.

Example 3

A heat shrinkable film was prepared by the same method in Example 1 except that the PET resin chip and the polyester based copolymer chip were blended at a ratio of 9:1.

Example 4

A heat shrinkable film was prepared by the same method in Example 1 except that a polyester based copolymer chip in which the content of the cyclohexane dimethanol compound was 20 mol % based on the content of terephthalic acid was used as the raw material and the PET resin chip and the polyester based copolymer chip were blended at a ratio of 1:9.

Example 5

A heat shrinkable film was prepared by the same method in Example 4 except that the PET resin chip and the polyester based copolymer chip were blended at a ratio of 4:6.

Comparative Example 1

A heat shrinkable film was prepared by the same method as in Example 1 except that a polyester based copolymer chip including a 1,4-cyclohexane dimethanol monomer at a content of 30 mol % based on a content of terephthalic acid without including 4-(hydroxymethyl)cyclohexylmethyl 4'-(hydroxymethyl)cyclohexane carboxylate and 4,4-(oxybis (methylene)bis) cyclohexane methanol was used and the PET resin chip and the polyester based copolymer chip were blended at a ratio of 1:9.

Comparative Example 2

A heat shrinkable film was prepared by the same method as in Example 1 except for using only a polyester based copolymer chip including a 1,4-cyclohexane dimethanol monomer at a content of 30 mol % based on a content of terephthalic acid without using the PET resin chip.

Comparative Example 3

A heat shrinkable film was prepared by the same method as in Example 1 except for using only the PET resin chip without using the polyester based copolymer chip.

Experimental Example 1: Heat Shrinkage Rate

After heat shrinkable films prepared in Examples and Comparative Examples were cut into a square (10 cmm×10 cmm) and drawn at a draw ratio (DR) of 1:5 or 1:6 (MD:TD) and a draw speed of 20 mm/sec., the films were put into an oven at a temperature shown in Table 1 for 40 seconds to thereby be heat-shrunk. Thereafter, lengths of the samples in horizontal and vertical directions were measured, and the heat shrinkage rates were calculated by the following Equation. The results were shown in the following Table 1.

Heat shrinkage rate (%)=100×(length before shrinkage−length after shrinkage)/(length before shrinkage)

Experimental Example 2: Transmissivity (Transparency)

Transmissivity (%) at a wavelength of 400 nm of the heat shrinkable films prepared in Examples and Comparative Examples was measured using a UV/Vis spectrophotometer (JASCO V530) and the results were shown in the following Table 1.

TABLE 1

|  | Example 1 | Example 2 | Example 3 | Example 4 | Example 5 | Comparative Example 1 | Comparative Example 2 | Comparative Example 3 |
|---|---|---|---|---|---|---|---|---|
| Diol Monomer | Mixture of Compounds of Chemical Formulas 1 and 2 and 1,4-Cyclohexane Dimethanol (Cyclohexane Dimethanol Based compounds) 30 mol % | | | Mixture of Compounds of Chemical Formulas 1 and 2 and 1,4-Cyclohexane Dimethanol (Cyclohexane Dimethanol Based compounds) 20 mol % | | 1,4-Cyclohexane Dimethanol 30 mol % | | — |
| Mixing Ratio of PET:Polyester based copolymer | 1:9 | 7:3 | 9:1 | 1:9 | 4:6 | 1:9 | 0:10 | 10:0 |
| Molding Temperature (Feeder, ° C.) | 255 | 255 | 255 | 255 | 255 | 255 | 265 | 260 |
| Molding Temperature (Die, ° C.) | 275 | 275 | 275 | 270 | 270 | 275 | 265 | 260 |
| Shrinkage Initiation Temperature (° C.) | 69 | 73 | 74 | 71 | 72 | 73 | 76 | — |
| Heat Shrinkage Rate (%) at 90° C. | 76 | 65 | 60 | 71 | 59 | 66 | 68 | 51 |
| Heat Shrinkage Rate (%) at 95~100° C. | 80 | 68 | 62 | 74 | 63 | 71 | 75 | 53 |
| Transparency (%) | 88 | 85 | 83 | 87 | 84 | 86 | 89 | 78 |

As shown in Table 1, the shrinkage rate and the shrinkage initiation temperature may be changed to the desired level by adjusting the mixing ratio of polyethylene terephthalate (PET) and the polyester based copolymer according to the present invention, and since the shrinkage rate was high and the shrinkage initiation temperature was low as compared to the cases of applying the polyester based copolymer in which the 1,4-cyclohexane dimethanol monomer that was generally widely used was included at a content of 30 mol % based on the content of terephthalic acid, the shrinkage speed was slow, such that a process may be smoothly controlled, thereby decreasing a defect rate. Therefore, a heat shrinkable film product having excellent moldability may be obtained by molding the composition for forming a heat shrinkable film as described above through an extruding and drawing process.

Although the present invention has been described in detail based on particular features thereof, and it is obvious to those skilled in the art that these specific technologies are merely preferable embodiments and thus the scope of the present invention is not limited to the embodiments. Therefore, the substantial scope of the present invention is defined by the accompanying claims and equivalent thereof.

The invention claimed is:
1. A method for preparing a heat shrinkable film comprising: injecting and extruding a composition comprising:
   a polyethylene terephthalate (PET) resin having an inherent viscosity of 0.50 to 1.2 dl/g; and
   a polyester based copolymer including a dicarboxylic acid-derived residue including a residue derived from an aromatic dicarboxylic acid; and
   a diol-derived residue including a residue derived from 4-(hydroxymethyl)cyclohexylmethyl 4'-(hydroxymethyl)cyclohexane carboxylate represented by the following Chemical Formula 1, a residue derived from 4,4-(oxybis(methylene)bis) cyclohexane methanol represented by the following Chemical Formula 2, and a residue derived from 1,4-cyclohexane dimethanol, to draw the extruded product,
wherein the polyester based copolymer is prepared by reacting the dicarboxylic acid-derived residue and the diol-derived residue to perform an esterification reaction and a polycondensation reaction,
wherein a total content of 4-(hydroxymethyl)cyclohexylmethyl 4'-(hydroxymethyl)cyclohexane carboxylate and the residue derived from 4,4-(oxybis(methylene) bis) cyclohexane methanol is 2 to 17 mol % of the entire diol,
wherein the 4-(hydroxymethyl)cyclohexylmethyl 4' (hydroxymethyl)cyclohexane carboxylate, the 4,4-(oxybis (methylene)bis) cyclohexane methanol, and the 1,4-cyclohexane dimethanol are present in an amount of 20 to 30 mol % relative to 100 mol % of the dicarboxylic acid, and
wherein a temperature of a feeder of an extruder is lower than a temperature of a die, wherein the temperature of the die is between 270 and 275° C.

[Chemical Formula 1]

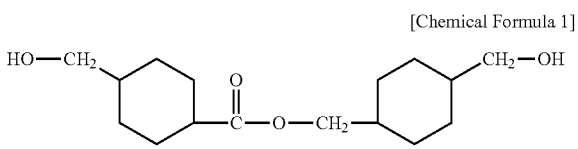

-continued
[Chemical Formula 2]
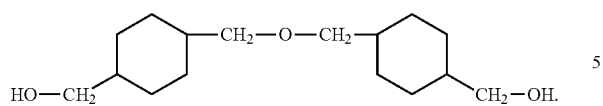
5
* * * * *